(12) United States Patent
Dickhaus

(10) Patent No.: US 7,130,919 B1
(45) Date of Patent: Oct. 31, 2006

(54) TELECOMMUNICATIONS NETWORK AND METHOD FOR TRANSMITTING MANAGEMENT DATA

(75) Inventor: Bertold Dickhaus, Düsseldorf (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/959,197

(22) PCT Filed: Mar. 29, 2000

(86) PCT No.: PCT/EP00/02737

§ 371 (c)(1),
(2), (4) Date: Dec. 14, 2001

(87) PCT Pub. No.: WO00/64102

PCT Pub. Date: Oct. 26, 2000

(30) Foreign Application Priority Data

Apr. 20, 1999 (DE) ................... 199 17 750

(51) Int. Cl.
*G06F 15/173* (2006.01)
*G06F 15/16* (2006.01)

(52) U.S. Cl. .............. 709/238; 709/238; 709/236; 709/223

(58) Field of Classification Search ........... 709/223, 709/224, 225, 226, 230, 232, 238, 236
See application file for complete search history.

(56) References Cited

U.S. PATENT DOCUMENTS 6,205,121 B1 * 3/2001 Heuer ................ 370/250
6,216,166 B1 * 4/2001 Zheng et al. ............ 709/238
6,236,660 B1 * 5/2001 Heuer .................... 370/409
6,260,062 B1 * 7/2001 Davis et al. ............. 709/223
6,799,211 B1 * 9/2004 Bennett et al. .......... 709/224

FOREIGN PATENT DOCUMENTS

| | | |
|---|---|---|
| DE | 197 40 107 A1 | 3/1999 |
| EP | 0 559 091 A2 | 9/1993 |
| JP | 0 532 7642 | 12/1993 |
| JP | 05327642 A | 12/1993 |
| JP | 00232469 A | 8/2000 |

OTHER PUBLICATIONS

Katz et al. "SDH Management Network: Architecture, Routing and Addressing" Proceedings of the Global Telecommunications Conference (Globecom), U.S. New York, IEEE, Vol. -, Nov. 29, 1993 pp. 223-228 (XP00028058).

* cited by examiner

*Primary Examiner*—Ario Etienne
*Assistant Examiner*—El Hadji M. Sall
(74) *Attorney, Agent, or Firm*—Cohen, Pontani, Lieberman & Pavane

(57) ABSTRACT

A system and method for providing a telecommunications network with an improved way of transmitting management data between individual network elements, wherein all network elements (NEA1–NEA4) of the first type, which are supplied with the management data, form part of an at least partly closed ring (T1–T4) by way of which the management data is transmittable in the payload area of the data signals.

54 Claims, 2 Drawing Sheets

TELECOMMUNICATIONS NETWORK AND METHOD FOR TRANSMITTING MANAGEMENT DATA

PRIORITY CLAIM

This is a national stage of PCT application No. PCT/EP00/02737, filed on Mar. 29, 2000. Priority is claimed on patent application No. 19917750.3 filed in Germany on Apr. 20, 1999.

FIELD OF THE INVENTION

The invention relates to a telecommunications network comprising a plural number of network elements of a first type for transmitting data signals comprising a header area and a payload area, with a specific area in the header of the data signals being provided for transporting management data between the various network elements of the first type, and with the transmission path between the network elements of the first type leading via network elements of a further type, where the area in the header of the data signals provided for management data is not usable for management data, and with the network elements of the first type comprising termination points for transmitting the management data from the header area to the payload area of the data signals or vice versa. The invention also relates to a method for transmitting management data between network elements of a first type of such a telecommunications network.

BACKGROUND OF THE INVENTION

The network elements of telecommunications networks such as SDH networks require management information for data transfer. In order to be able to provide such information to the individual network elements from a central point, nowadays the network elements are usually interconnected via a data channel network (DCN) for the transmission of management data. Management of the traffic is via PCs or UNIX computers which provide the management data to one of the network elements via a management interface.

For example the standardised Q3 protocol can be used for managing network elements, with the management data being transported between the individual network elements in areas of the header of data blocks, reserved for the data channel network, such as within the header areas of a multiplexer or a regeneration section of SDH signals.

Frequently however, network elements used provide for non-standardised protocols for management. This can lead to problems in areas where network elements from various providers are used if for the transmission of management data from one network element which for example provides for the use of the Q3 protocol, a path to the other such network element is used which leads via network elements with another management protocol. This means that the areas of the header of data blocks which according to the Q3 protocol are provided for management data, cannot be used for transporting management data because these areas may be used for other purposes by the network elements using another management protocol. Thus in this case transmission of management data by means of standardised Q3 routing and thus remote managing of the target network element is not possible. The same problem occurs analogously with any other management protocol which is based on the transmission of management data in the header area of data signals.

For illustration, FIG. 2 shows an example of a section of a telecommunications network with network elements from various providers. The network is divided into a first area A with network elements NEA1–NEA3 of the provider A and a second area B with network elements NEB1–NEB3 of provider B. The connections between the shown network elements NEA1–NEA3 of provider A are all routed via network elements NEB1–NEB3 of provider B. All data which is to be transmitted from one of the network elements NEA1–NEA3 to another of the network elements NEA1–NEA3, thus needs to be forwarded from network elements NEB1, NEB2, NEB3 of provider B.

The network element NEA1 of provider A comprises a Q3 management interface by way of which management data can be input by a remote computer. In the example shown, this management data which is inserted in the areas of the header provided for this purpose, of the data blocks leaving the network element, cannot simply be transmitted to the network elements NEA2, NEA3 which also need this management data, because the Q3 areas in the header of the data blocks in the area with network elements NEB1, NEB2, NeB3 of provider B may be used for different purposes.

The same problem is encountered if different network elements provide for routing of management data according to a single management protocol, but the network operator desires strict separation between management of various groups of network elements.

Similarly, equipment of various manufacturers may be used layer by layer, with separate management being necessary.

For this reason, in practice, so-called "tunnelling" is used for the transmission of management data via network elements which provide for another management protocol or for separate management.

With tunnelling, data which usually, in accordance with a particular management protocol, is transported to areas in the header of data blocks provided for this purpose, is inserted into the area of the payload. During subsequent transmission of data it is then immaterial what software protocols in network elements of other providers by way of which transmission takes place, are used. The data in the area of the payload is not subject to interpretation and distribution by software. Instead, simple byte-by-byte transmission is carried out, with strict standardisation existing in planes in close physical proximity, which standardisation is applied equally by all providers.

Insertion of management data which is really transported in the header of the data blocks, into the area for the payload, takes place via termination points TP in a network element (head-end NE) which has access to management data according to protocol. Here, the term "access according to protocol" designates access which is provided according to the management protocol used by the network elements between which management data is to be transmitted. Such access according to protocol can for example exist in a management interface integrated into the network element, with the management data being input by an associated computer. But access can also consist of receiving data blocks with the management data in the header area provided for this purpose, by another network element which uses the same management protocol.

The network element with access according to protocol, to the management data, comprises a termination point TP for every other network element which needs to be supplied with management data via tunnelling. Starting from the network element to which the management data is directly made available, in a star-shaped manner, tunnels are formed to the other network elements in which the management data is transmitted in the area of the payload of data blocks. Each of the destination network elements comprises a termination point TP by means of which the management data is taken from the payload area and inserted into the header of a data block.

In the case of SDH networks, for transmission in the payload area, management data can for example be inserted into suitable areas of the transported virtual containers (VCs) within the STM signal or the PDH signal. Possible suitable insertion points may be one or several bits in the R-bytes (reserved but so far unused) of VC-12 containers. Further possibilities may be one or several bits in the standard F2 byte or in one of the time slots, in particular time slot 0, of a transported 2M signal.

If a large number of network elements are to be centrally managed by tunnelling, via a single management access in one of the network elements, the problem is encountered that the network element with access according to protocol, to the management data, needs to comprise a large number of termination points, namely one TP for each of the other network elements to be managed, which are reached via network elements working with another management protocol. Thus this necessitates considerable effort by this particular network element. Furthermore, there is the possibility that in extraneous networks comprising network elements with other management protocols, unnecessary capacity is used if the same data is to be transported several times over longer distances. In addition it must also be borne in mind that in the case of a failure of a tunnel, the associated network element is for the time being cut off from the supply of management data.

SUMMARY OF THE INVENTION

It is thus the object of the invention to provide a telecommunications network with an improved system of transmitting management data between individual network elements. It is also the object of the invention to provide an improved method for transmitting management data between network elements.

According to the invention this object is met firstly by a telecommunications network according to the precharacterising portion of claim 1 in that all network elements of the first type, for their supply with the management data, form part of an at least partly closed ring by way of which the management data is transmittable in the payload area of the data signals. Secondly this object is met by a method for transmitting management data between network elements of a first type of a telecommunications network, with the network elements of the first type being used for transmitting data signals comprising a header and a payload area, where a specific area in the header of the data signals being provided for transporting management data, and with the transmission path between the network elements of the first type leading via network elements of a further type where the area in the header of the data signals provided for management data is not to be used for management data of the network elements of the first type, and with the method, starting with one of the network elements of the first type which comprises the management data, from network element to network element, for each of the network elements of the first type the following steps are carried out:

Insertion of the management data into the payload area of a data signal leading to a further network element, of which there is at least one, of the first type;

Transmission of the data signal to the further network element, of which there is at least one, of the first type; and Extraction of the management data from the payload area of the data signal in the further network element of the first type, of which there is at least one, to which the data signal was transmitted;

until all network elements of the first type are provided with the management data.

The embodiment of a telecommunications network according to the invention and the method according to the invention provide the advantage in that the network element with access according to protocol to the management data does not require any separate management connection to all the network elements which need to be supplied with management data by way of tunnelling. This means that there is reduced expenditure in the case of the network element with access according to protocol to the management data, because each tunnel connection requires separate means in the network element, for inserting the data from the header area into the payload area of the data signals. Depending on the number of the network elements which need to be supplied by tunnelling by a network element with access according to protocol to the management data, the reduced expenditure can thus be very considerable.

In a ring-shaped linkage of the individual network elements, according to the invention, in the network element with access according to protocol to the management data, as in all other network elements, only two termination points are required. In a mesh-shaped linkage, depending on the configuration, two or more termination points are to be provided for each network element but no termination point for each network element in the network element with access according to protocol, to the management data.

Since now there is no longer a need for at least one tunnel from each network element to the network element with access according to protocol to the management data, there is now also a reduced need for capacity within extraneous networks for the purpose of these connections alone.

Finally, in the case of a closed ring-shaped or mesh-shaped connection of the network elements, the supply to individual network elements is now more reliable. If a management sequence realised as a tunnel encounters interference from an extraneous network, in the case of a telecommunications network according to the invention there is always the option of at least one alternative access to the management data.

Preferred embodiments of the invention are provided in the dependent claims.

BRIEF DESCRIPTION OF THE DRAWINGS

Below, the invention is illustrated in more detail with reference to drawings, as follows.

DETAILED DESCRIPTION OF THE EXEMPLARY EMBODIMENTS

Figure 2:
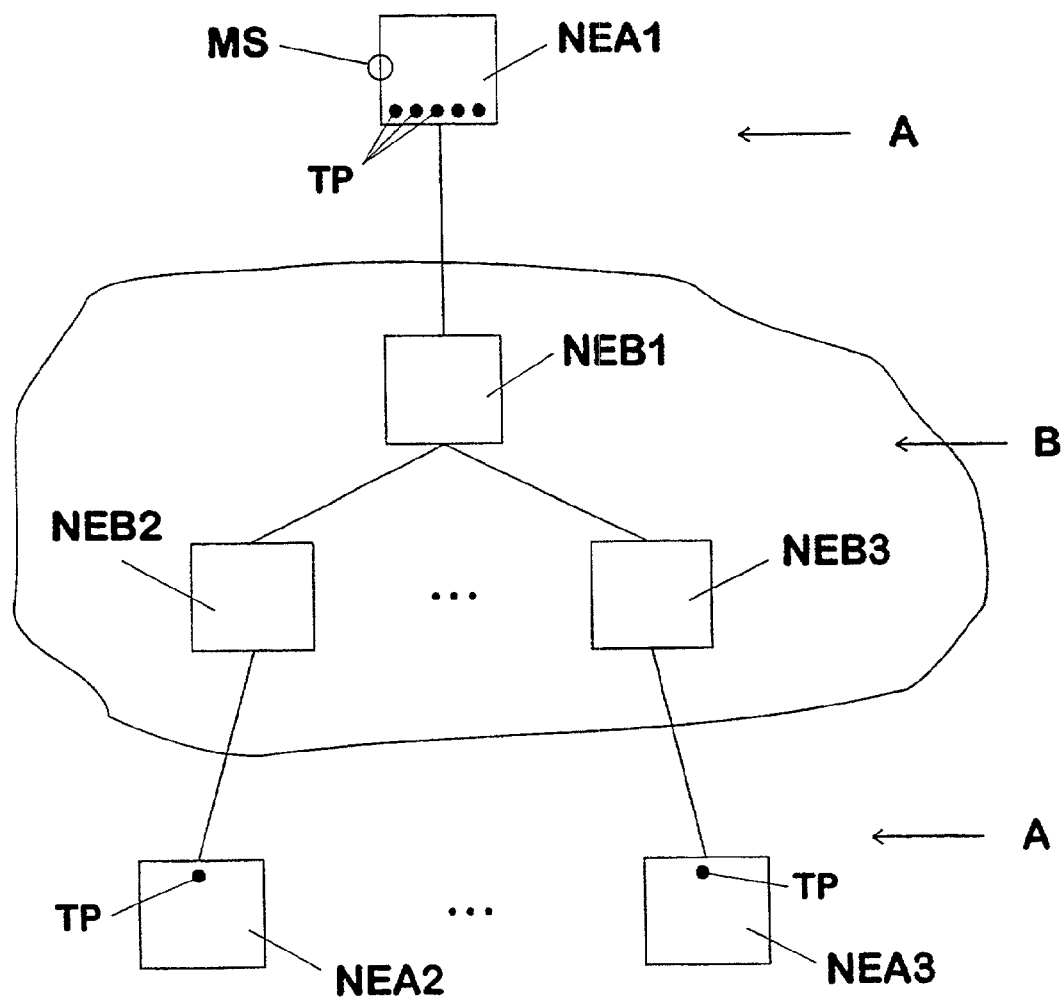
FIG. 2: shows a telecommunications network with various areas in which network elements of various providers are used, with a management system known from the state of the art.

FIG. 2 has already been described above, in the context of the state of the art.

Figure 1:
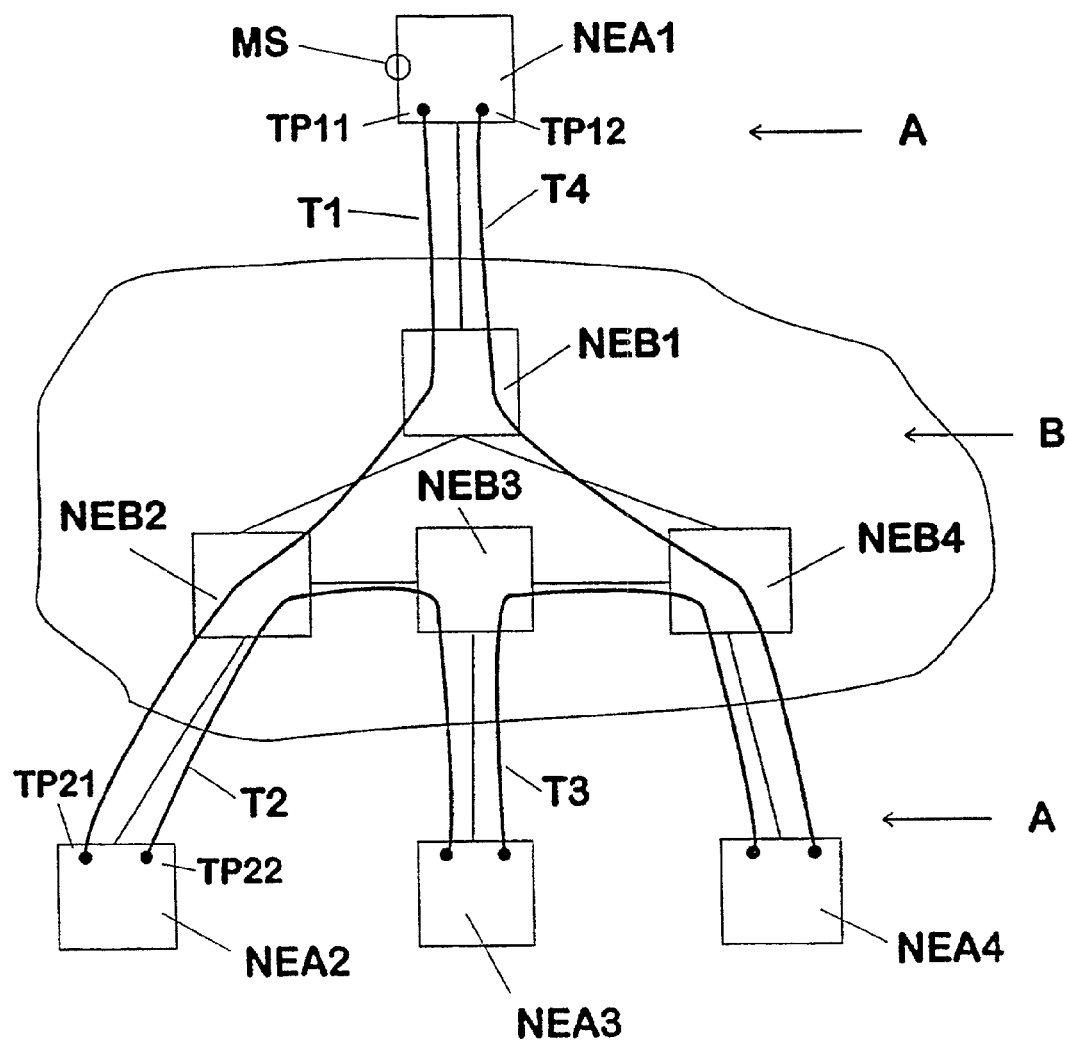
FIG. 1: shows a telecommunications network with various areas in which network elements of various providers are used, comprising a management system according to the invention.

FIG. 1 shows a telecommunications network comprising the areas A, B which are assigned to two different providers A, B.

The area A of the first provider A shows four network elements NEA1–NEA4. Management of data transmission in this area A is according to the standardised Q3 protocol. The network in area B of the second provider B also comprises four network elements NEB1–NEB4. Here, management of data transmission is via a non-standardised protocol.

For interconnection for data transfer between the network elements NEA1–NEA4 in the area of provider A, only data lines such as fibre optic cables are available; similarly through area B via network elements NEB1–NEB4 of provider B.

One of the network elements NEA1 in area A comprises a Q3 interface MS. The network element NEA1 is connected to a management computer (not shown) via this interface MS. Each of the network elements NEA1–NEA4 of provider A comprises two termination points TP11, TP12, TP21, TP22.

Furthermore, several tunnels T1–T4 are shown, leading from a termination point TP11, TP12, TP21, TP22 of a network element to a termination point of another network element which as a whole form a data channel network in the form of a closed ring-shaped connection between the network elements NEA1–NEA4 of provider A.

The network of provider A provides for central input of the management data. Data is provided to network element NEA1 via a computer in close proximity to said network element NEA1, via management interface MS. All other network elements NEA2–NEA4 now need to obtain the management data from the network element NEA1 with the management interface MS.

All network elements which are accessible to network element NEA1 directly or without insertion of network elements by other providers, can receive the management data in the header of transmitted data blocks, according to the Q3 protocol.

Since the displayed network elements NEA2–NEA4 of provider A can only be reached via the network elements NEB1–NEB4 of the second provider B who uses another management protocol, the areas in the header of the transmitted data block, which are provided for management data according to the Q3 standard, are not available in the area of provider B.

For this reason the data received via management interface MS, by means of the termination points TP 11 of the network element NEA1, is inserted into the R-byte of a virtual container, i.e. in the payload area of the signal. The signal is then transmitted to the network element NEA2 via the network elements NEB1, NEB2 of provider B via tunnel T1. When inserted into a virtual container, the management data can pass the area of provider B without hindrance because no evaluations or changes of data take place in the payload area.

In the termination point TP21 of the network element NEA2, the management data is extracted from the R-byte in the virtual container and inserted into that area in the header of the data blocks actually provided for Q3 management data, so that the data is now available to the network element NEA2 for use according to the standard. In addition, the management data is now inserted into the payload area of the data signal by means of the second termination point TP22 of the network element NEA2 to the network element NEA3 of provider A and transmitted via tunnel T2.

In the network element NEA3 the management data is extracted from the payload for one's own use and inserted into the header of the data blocks for re-transmission via a termination point to directly linked network elements (not shown) of provider A.

Analogously, transmission of the management data subsequently takes place from the network element NEA3 to the network element NEA4 via tunnel T3 and from there again to network element NEA1 via tunnel T4.

If there is an interruption in one of tunnels T1–T3, then transmission of the management data can immediately take place from the network element NEA1 to network element NEA4 via tunnel T4, and, depending on the location where the interruption occurred, onward to the network elements NEA3 and NEA2.

The tunnel network according to the invention can also be used with terminal multiplexers. In this case the termination points, of which there are at least two, which form the end points of a tunnel, are connected by a single physical transmission channel but with two or more payload areas of the SDH signal in which management data is entered, such as e.g. several virtual containers.

What is claimed is:

1. A telecommunications network comprising a plural number of network elements (NEA1–NEA4) of a first type for transmitting data signals comprising a header area and a payload area, with a specific area in the header of the data signals being provided for transporting management data between the various network elements (NEA1–NEA4) of the first type, and with a transmission path between the network elements (NEA1–NEA4) of the first type leading via network elements (NEB1–NEB4) of a further type, where the area in the header of the data signals provided for transporting management data between the network elements (NEA1–NEA4) of the first type is not usable for this management data between the network elements (NEB1–NEB4) of the further type, and with the network elements (NEA1–NEA4) of the first type comprising termination points (TP11, TP12, TP21, TP22) for one of inserting management data from the header area to the payload area of the data signal and inserting the management data from the payload area to the header area of the data signal wherein all network elements (NEA1–NEA4) of the first type, for their supply with the management data, form part of an at least partly closed ring (T1–T4) by way of which the management data is transmittable in the payload area of the data signals.

2. The telecommunications network according to claim 1, wherein the telecommunications network is an SDH network.

3. The telecommunications network according to claim 1, wherein the ring (T1–T4) by way of which the management data in the payload area is transmitted by data signals, is at least one of closed and supplemented by mesh-shaped connections.

4. The telecommunications network according to claim 1, wherein each of the network elements (NFA1–NFA4) of the first type comprises two termination points (TP11, TP12, TP21, TP22).

5. The telecommunications network according to claim 1, wherein central input of management data is provided.

6. The telecommunications network according to claim 1, wherein one of the network elements (NEA1–NEA4) of the first type comprises a management interface (MS) for a connection to a computer by way of which management data can be input.

7. The telecommunications network according to claim 1, wherein one of the network elements (NEA1–NEA4) of the first type comprises a direct connection to a network element of the same type by way of which management data can be received in the area provided for this purpose in the header of data signals.

8. The telecommunications network according to claim 1, wherein the network elements (NEB1–NEB4) of the further type use a management protocol which differs from that of the network elements (NEA1–NEA4) of the first type, or that separate management is provided for the network elements (NEA1–NEA4) of the first type and for the network elements (NEB1–NEB4) of the further type.

9. The telecommunications network according to claim 1, wherein management of data transmission through the network elements (NEA1–NEA4) of the first type is based on the standardised Q3 protocol.

10. The telecommunications network according to claim 1, wherein one of the network elements (NEA1) of the first type comprises a Q3 management interface (MS) for management access to the telecommunications network.

11. A method for transmitting management data between network elements of a first type of a telecommunications network, with the network elements (NEA1–NEA4) of the first type being used for transmitting data signals comprising a header and a payload area, where a specific area in the header of the data signals is provided for transporting management data, and with a transmission path between the network elements (NEA1–NEA4) of the first type leading via network elements (NEB1–NEB4) of a further types where the area in the header of the data signals provided for transporting management data between the network elements (NEA1–NEA4) of the first type is not to be used for this management data between the network elements (NEB1–NEB4) of the further type, and with the method, starting with one of the network elements (NEA1) of the first type which comprises the management data, from network element to network element for each of the network elements (NEA1–NEA4) of the first type, the method comprising the steps of:
  inserting the management data into the payload area of a data signal leading to a further network element, of which there is at least one, of the first type;
  transmitting the data signal to the further network element, of which there is at least one, of the first type; and
  extracting the management data from the payload area of the data signal in the further network element of the first type, of which there is at least one, to which the data signal was transmitted; until all network elements (NEA1–NEA4) of the first type are provided with the management data.

12. The method according to claim 11, wherein insertion and extraction of the management data takes place via termination points (TP11, TP12, TP21, TP22) of which at least two each are used in each of the network elements (NEA1–NEA4) of the first type.

13. The method according to claim 12, wherein the extracted management data is inserted by the termination points (TP11, TP12, TP21, TP22) into the header areas provided for this purpose, of the data blocks.

14. The method according to claim 11, wherein virtual containers of an STM signal or a PDH signal are used as areas (B2) of the payload in the data blocks into which management data is inserted.

15. The method according to claim 14, wherein within the virtual containers into which the management data is inserted, R-bytes of a VC-12, F2 bytes or one of the time slots, in particular time slot 0 of a 2M signal, are selected as a location for insertion.

16. The telecommunications network according to claim 2, wherein the ring (T1–T4) by way of which the management data in the payload area is transmitted by data signals, is at least one of closed and supplemented by mesh-shaped connections.

17. The telecommunications network according to claim 2, wherein each of the network elements (NBA1–NEA4) of the first type comprises two termination points (TP11, TP12, TP21, TP22).

18. The telecommunications network according to claim 3, wherein each of the network elements (NEA1–NEA4) of the first type comprises two termination points (FP12, TP12, TP21, TP22).

19. The telecommunications network according to claim 2, wherein central input of management data is provided.

20. The telecommunications network according to claim 3, wherein central input of management data is provided.

21. The telecommunications network according to claim 4, wherein central input of management data is provided.

22. The telecommunications network according to claim 2, wherein one of the network elements (NEA1–NEA4) of the first type comprises a management interface (MS) for a connection to a computer by way of which management data can be input.

23. The telecommunications network according to claim 3, wherein one of the network elements (NEA1–NEA4) of the first type comprises a management interface (MS) for a connection to a computer by way of which management data can be input.

24. The telecommunications network according to claim 4, wherein one of the network elements (NEA1–NEA4) of the first type comprises a management interface (MS) for a connection to a computer by way of which management data can be input.

25. The telecommunications network according to claim 5, wherein one of the network elements (NEA1–NEA4) of the first type comprises a management interface (MS) for a connection to a computer by way of which management data can be input.

26. The telecommunications network according to claim 2, wherein one of the network elements (NEA1–NEA4) of the first type comprises a direct connection to a network element of the same type by way of which management data can be received in the area provided for this purpose in the header of data signals.

27. The telecommunications network according to claim 3, wherein one of the network elements (NEA1–NEA4) of the first type comprises a direct connection to a network element of the same type by way of which management data can be received in the area provided for this purpose in the header of data signals.

28. The telecommunications network according to claim 4, wherein one of the network elements (NEA1–NEA4) of the first type comprises a direct connection to a network element of the same type by way of which management data can be received in the area provided for this purpose in the header of data signals.

29. The telecommunications network according to claim 5, wherein one of the network elements (NEA1–NEA4) of the first type comprises a direct connection to a network element of the same type by way of which management data can be received in the area provided for this purpose in the header of data signals.

30. The telecommunications network according to claim 6, wherein one of the network elements (NEA1–NEA4) of the first type comprises a direct connection to a network element of the same type by way of which management data can be received in the area provided for this purpose in the header of data signals.

31. The telecommunications network according to claim 2, wherein the network elements (NEB1–NEB4) of the further type use a management protocol which differs from that of the network elements (NBA1–NEA4) of the first type, or that separate management is provided for the network elements (NBA1–NEA4) of the first type and for the network elements (NEB1–NEB4) of the further type.

32. The telecommunications network according to claim 3, wherein the network elements (NEB1–NEB4) of the further type use a management protocol which differs from that of the network elements (NEA1–NEA4) of the first type, or that separate management is provided for the network elements (NEA1–NEA4) of the first type and for the network elements (NEB1–NEB4) of the further type.

33. The telecommunications network according to claim 4, wherein the network elements (NEB1–NEB4) of the further type use a management protocol which differs from that of the network elements (NEA1–NEA4) of the first type, or that separate management is provided for the network elements (NEA1–NEA4) of the first type and for the network elements (NFB1–NEB4) of the further type.

34. The telecommunications network according to claim 5, wherein the network elements (NEB1–NEB4) of the further type use a management protocol which differs from that of the network elements (NEA1–NEA4) of the first type, or that separate management is provided for the network elements (NEA1–NEA4) of the first type and for the network elements (NEB1–NEB4) of the further type.

35. The telecommunications network according to claim 6, wherein the network elements (NEB1–NEB4) of the further type use a management protocol which differs from that of the network elements (NEA1–NEA4) of the first type, or that separate management is provided for the network elements (NEA1–NBA4) of the first type and for the network elements (NEB1–NEB4) of the further type.

36. The telecommunications network according to claim 7, wherein the network elements (NEB1–NEB4) of the further type use a management protocol which differs from that to the network elements (NEA1–NEA4) of the first type, or that separate management is provided for the network elements (NEA1–NEA4) of the first type and for the network elements (NEB1–NEB4) of the further type.

37. The telecommunications network according to claim 2, wherein management of data transmission through the network elements (NEA1–NEA4) of the first type is based on the standardised Q3 protocol.

38. The telecommunications network according to claim 3, wherein management of data transmission through the network elements (NEA 1-NEA4) of the first type is based on the standardised Q3 protocol.

39. The telecommunications network according to claim 4, wherein management of data transmission through the network elements (NEA1–NEA4) of the first type is based on the standardised Q3 protocol.

40. The telecommunications network according to claim 5, wherein management of data transmission through the network elements (NEA1–NEA4) of the first type is based on the standardised Q3 protocol.

41. The telecommunications network according to claim 6, wherein management of data transmission through the network elements (NEA1–NEA4) of the first type is based on the standardised Q3 protocol.

42. The telecommunications network according to claim 7, wherein management of data transmission through the network elements (NEA1–NEA4) of the first type is based on the standardised Q3 protocol.

43. The telecommunications network according to claim 8, wherein management of data transmission through the network elements (NEA1–NEA4) of the first type is based on the standardised Q3 protocol.

44. The telecommunications network according to claim 2, wherein one of the network elements (NBA 1) of the first type comprises a Q3 management interface (MS) for management access to the telecommunications network.

45. The telecommunications network according to claim 3, wherein one of the network elements (NEA1) of the first type comprises a Q3 management interface (MS) for management access to the telecommunications network.

46. The telecommunications network according to claim 4, wherein one of the network elements (NEA1) of the first type comprises a Q3 management interface (MS) for management access to the telecommunications network.

47. The telecommunications network according to claim 5, wherein one of the network elements (NEA 1) of the first type comprises a Q3 management interface (MS) for management access to the telecommunications network.

48. The telecommunications network according to claim 6, wherein one of the network elements (NEA1) of the first type comprises a Q3 management interface (MS) for management access to the telecommunications network.

49. The telecommunications network according to claim 7, wherein one of the network elements (NEA1) of the first type comprises a Q3 management interface (MS) for management access to the telecommunications network.

50. The telecommunications network according to claim 8, wherein one of the network elements (NEA1) of the first type comprises a Q3 management interface (MS) for management access to the telecommunications network.

51. The telecommunications network according to claim 9, wherein one of the network elements (NEA1) of the first type comprises a Q3 management interface (MS) for management access to the telecommunications network.

52. The method according to claim 11, wherein the virtual containers of an STM signal or a PDH signal are used as areas (B2) of the payload in the data blocks into which management data is inserted.

53. The method according to claim 12, wherein the virtual containers of an STM signal or a PDH signal are used as areas (B2) of the payload in the data blocks into which management data is inserted.

54. The method according to claim 13, wherein the virtual containers of an STM signal or a PDH signal are used as areas (B2) of the payload in the data blocks into which management data is inserted.

* * * * *